US009156731B2

(12) United States Patent
Murayama et al.

(10) Patent No.: US 9,156,731 B2

(45) Date of Patent: Oct. 13, 2015

(54) INORGANIC FIBERS

(75) Inventors: Kazutaka Murayama, Tokyo (JP); Jun Oikawa, Tokyo (JP); Kiyoshi Sato, Tokyo (JP)

(73) Assignee: NICHIAS CORPORATION, Tokyo (JP)

( * ) Notice: Subject to any disclaimer, the term of this patent is extended or adjusted under 35 U.S.C. 154(b) by 43 days.

(21) Appl. No.: 14/001,600

(22) PCT Filed: Aug. 26, 2011

(86) PCT No.: PCT/JP2011/069273

§ 371 (c)(1), (2), (4) Date: Aug. 26, 2013

(87) PCT Pub. No.: WO2012/114565

PCT Pub. Date: Aug. 30, 2012

(65) Prior Publication Data

US 2013/0331254 A1 Dec. 12, 2013

(30) Foreign Application Priority Data

Feb. 24, 2011 (JP) ................................ 2011-038403

(51) Int. Cl.

| | |
|---|---|
| ***C03C 13/00*** | (2006.01) |
| ***C04B 35/622*** | (2006.01) |
| ***C03B 37/01*** | (2006.01) |
| ***C03C 13/06*** | (2006.01) |
| *D01D 5/00* | (2006.01) |

(52) U.S. Cl.

CPC ............... *C03C 13/00* (2013.01); *C03B 37/011* (2013.01); *C03C 13/06* (2013.01); *C04B 35/62231* (2013.01); *C04B 35/62236* (2013.01); *C04B 35/62245* (2013.01); *C03C 2213/02* (2013.01); *C04B 2235/3208* (2013.01); *C04B 2235/3418* (2013.01); *C04B 2235/5228* (2013.01); *C04B 2235/5264* (2013.01); *C04B 2235/656* (2013.01); *C04B 2235/6562* (2013.01); *C04B 2235/96* (2013.01); *D01D 5/0007* (2013.01)

(58) Field of Classification Search

CPC .... C03C 13/00; C03C 13/06; C03C 2213/00; C03C 2213/02; C03B 37/011; C04B 35/62231; C04B 35/62236; C04B 35/6225; C04B 35/62254; C04B 35/624; D01D 5/0007; D01D 5/0038; D01D 5/0046

USPC ........ 501/12, 35, 36, 95.1; 264/452, 621, 623

See application file for complete search history.

(56) References Cited

U.S. PATENT DOCUMENTS

| | | | |
|---|---|---|---|
| 4,954,462 | A | 9/1990 | Wood et al. |
| 2007/0020454 | A1 | 1/2007 | Zoitos |
| 2009/0130937 | A1 | 5/2009 | Wainwright |
| 2009/0208744 | A1 | 8/2009 | Komura et al. |

FOREIGN PATENT DOCUMENTS

| | | | |
|---|---|---|---|
| JP | 2756258 | B2 | 5/1998 |
| JP | 2004-183154 | A | 7/2004 |
| JP | 3979494 | B2 | 7/2007 |
| JP | 2009-515800 | A | 4/2009 |
| JP | 2011-106050 | A | 6/2011 |
| JP | 2011-196007 | A | 10/2011 |
| WO | 2006/129844 | A1 | 12/2006 |

OTHER PUBLICATIONS

International Search Report issued in corresponding application PCT/JP2011/069273, completed Oct. 6, 2011 and mailed Oct. 18, 2011.

International Preliminary Report on Patentability issued in corresponding application PCT/JP2011/069273 on Aug. 27, 2013.

*Primary Examiner* — Anthony J Green

*Assistant Examiner* — Elizabeth A Bolden

(74) *Attorney, Agent, or Firm* — Griffin & Szipl, P.C.

(57) ABSTRACT

Provided are inorganic fibers which can exhibit high biosolubility and have excellent heat resistance as the constituting material for a filter material, a sealing material or the like, while exerting minimized effects on the human body or the living environment even when the fibers have an average diameter of 1 μm or less. Inorganic fibers including 35 mass% to 88 mass% of $Al_2O_3$, 3 mass% to 45 mass% of CaO and 5 mass% to 40 mass% of $SiO_2$, wherein the total content of $Al_2O_3$, CaO and $SiO_2$ is 98 mass% or more of the entire fibers.

8 Claims, 1 Drawing Sheet

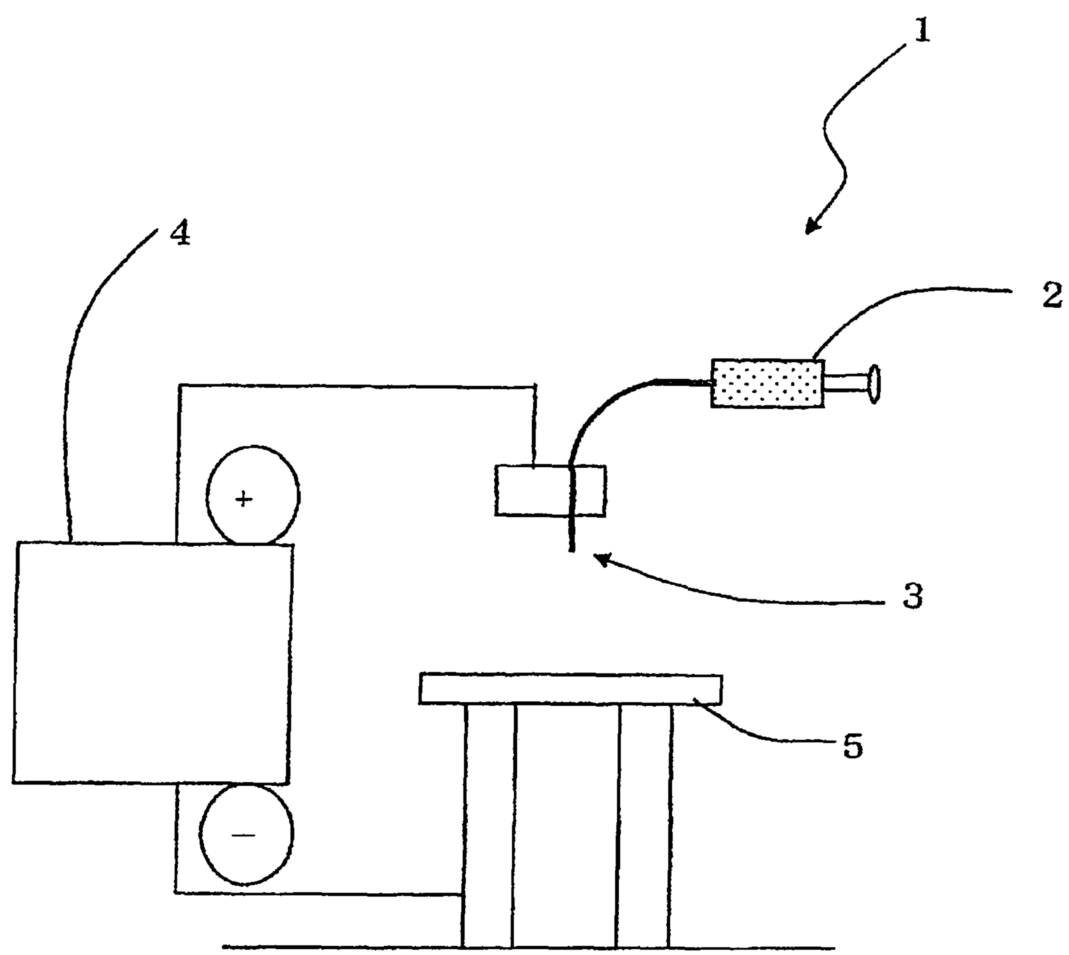
1
2
3
4
5
+
—

INORGANIC FIBERS

This is a National Phase Application in the United States of International Patent Application No. PCT/JP2011/069273 filed Aug. 26, 2011, which claims priority on Japanese Patent Application No. 2011-038403, filed Feb. 24, 2011. The entire disclosures of the above patent applications are hereby incorporated by reference.

TECHNICAL FIELD

The invention relates to inorganic fibers.

BACKGROUND ART

Inorganic fibers are composed mainly of fibers comprising an inorganic compound. They are expected to be used as a constituting material for a heat insulating material, a refractory material, or the like. In particular, inorganic fibers having an average fiber diameter of 1 μm or less are expected to be used as a filter material or a sealing material.

As for inorganic fibers having a small fiber diameter, asbestos have conventionally be known. Since asbestos have a small fiber diameter and have a high chemical resistance to body fluids, it reaches the inside of the lung by breathing, and adversely affects the cells in the alveolus for a long period of time, thereby affecting the human body. Further, as for inorganic fibers other than asbestos, in the case of inorganic fibers composed mainly of $SiO_2$, which have excellent heat resistance, it is known that $SiO_2$ is crystallized at high temperatures to generate crystobalite, and the crystobalite reaches the inside of the lung, thereby adversely affecting the human body.

Under such circumstances, as inorganic fibers having low chemical resistance to body fluids, inorganic fibers comprising 65 to 99 wt % of $Al_2O_3$ and 1 to 35 wt % of $SiO_2$ are proposed. These inorganic fibers are obtained by drawing a spinning solution formed of a solution comprising aluminum oxychloride, colloidal silica and a thickening agent from a plurality of spinning holes to obtain a fiber precursor, and the fiber precursor is then subjected to quick heating and quick quenching (see Patent Document 1 (U.S. Pat. No. 3,979,494)).

RELATED ART DOCUMENTS

Patent Documents

Patent Document 1: U.S. Pat. No. 3,979,494

DISCLOSURE OF THE INVENTION

Subject to be Solved by the Invention

The inventors made intensive studies. As a result, it was revealed that the inorganic fibers disclosed in Patent Document 1 did not always exhibit biosolubility. In addition, depending on the application of the inorganic fibers, inorganic fibers having a further higher biosolubility than that of the inorganic fibers disclosed in Patent Document 1 have been required.

Taking the above-mentioned problems into consideration, the invention is aimed at providing inorganic fibers having high biosolubility and excellent heat resistance.

Means for Solving the Subject

The inventors made intensive studies to solve the above-mentioned technical subject. As a result, the inventors have found that the subject can be solved by inorganic fibers having 35 mass % to 88 mass % of $Al_2O_3$, 3 mass % to 45 mass % of CaO and 5 mass % to 40 mass % of $SiO_2$, wherein the total of $Al_2O_3$, CaO and $SiO_2$ is 98 mass % or more of the entire fibers. The invention has been made based on this finding.

That is, the invention provides:

(1) Inorganic fibers comprising 35 mass % to 88 mass % of $Al_2O_3$, 3 mass % to 45 mass % of CaO and 5 mass % to 40 mass % of $SiO_2$, wherein the total content of $Al_2O_3$, CaO and $SiO_2$ is 98 mass % or more of the entire fibers.

(2) The inorganic fibers according to (1) comprising 39 mass % to 66 mass % of $Al_2O_3$, 26 mass % to 42 mass % of CaO and 8 mass % to 28 mass % of $SiO_2$, wherein the total content of $Al_2O_3$, CaO and $SiO_2$ is 98 mass % or more of the entire fibers.

(3) The inorganic fibers according to (1) or (2), wherein the inorganic fibers are produced by a method comprising:

solving water-soluble basic acid aluminum, a water-soluble calcium compound and water-soluble or water-dispersible silicon compound in an aqueous medium to produce an aqueous raw material solution for spinning;

spinning the aqueous raw material solution for spinning to obtain crude inorganic fibers; and firing the crude inorganic fibers.

(4) The inorganic fibers according to (3), wherein the water-soluble basic acid aluminum is one or more selected from compounds represented by $$Al(OH)_xY_z \quad (I)$$

wherein X is a positive integer of more than 0 and less than 3,

Y is one selected from a Cl atom, an $NO_3$ group, an $SO_4$ group and an RCOO group;

Z is 3-X when Y is a Cl atom, an $NO_3$ group or an RCOO group, (3-X)/2 when Y is an $SO_4$ group and R is a hydrogen atom or a hydrocarbon group or hydroxyl group-containing hydrocarbon group having 1 to 10 carbon atoms; and if a plurality of RCOO groups are present, the Rs may be the same or different.

(5) The inorganic fibers according to (3), wherein the spinning is conducted by the electrospinning method.

(6) The inorganic fibers according to (4), wherein the spinning is conducted by the electrospinning method.

According to the invention, inorganic fibers having a high biosolubility and a high heat resistance can be provided.

BRIEF DESCRIPTION OF THE DRAWINGS

FIG. 1 is a view showing one example of a spinning apparatus to be used in electrostatic spinning.

The inorganic fibers of the invention comprises 35 mass % to 88 mass % of $Al_2O_3$, 3 mass % to 45 mass % of CaO and 5 mass % to 40 mass % of $SiO_2$, wherein the total content of $Al_2O_3$, CaO and $SiO_2$ is 98 mass % or more of the entire fibers.

The inorganic fibers of the invention comprise $Al_2O_3$ in an amount of 35 mass % to 88 mass %, preferably 39 mass % to 87 mass %, more preferably 39 mass % to 83 mass %, further preferably 39 mass % to 66 mass %, with 49 mass % to 66 mass % being still further preferable.

When the content of $Al_2O_3$ is in the above-mentioned range, desired heat resistance tends to be obtained easily.

The inorganic fibers of the invention comprise CaO in an amount of 3 mass % to 45 mass %, preferably 3 mass % to 42 mass %, and further preferably 26 mass % to 42 mass %.

When the content of CaO is in the above-mentioned range, desired biosolubility tends to be obtained easily.

The inorganic fibers of the invention comprise $SiO_2$ in an amount of 5 mass % to 40 mass %, preferably 8 mass % to 39 mass %, further preferably 8 mass % to 28 mass %, with 8 mass % to 16 mass % being still further preferable.

When the content of $SiO_2$ is in the above-mentioned range, desired biosolubility tends to be obtained easily.

In the inorganic fibers of the invention, the total content of $Al_2O_3$, CaO and $SiO_2$ is 98 mass % or more of the entire fibers, more preferably 99 mass % or more of the entire fibers.

The inorganic fibers of the invention can comprise components which are inevitably mixed in an amount of less than 2 mass %. Here, the components which are inevitably mixed in mean impurities which are mixed in during the preparation of inorganic fibers.

The inorganic fibers of the invention comprise 35 mass % to 88 mass % of $Al_2O_3$, 3 mass % to 45 mass % of CaO and 5 mass % to 40 mass % of $SiO_2$, wherein the total content of $Al_2O_3$, CaO and $SiO_2$ is 98 mass % or more of the entire fibers. With this amount range, desired biosolubility and heat resistance can be exhibited.

The inorganic fibers of the invention comprise 39 mass % to 66 mass % of $Al_2O_3$, 26 mass % to 42 mass % of CaO and 8 mass % to 28 mass % of $SiO_2$, wherein the total content of $Al_2O_3$, CaO and $SiO_2$ is 98 mass % or more of the entire fibers. With this amount range, desired biosolubility and heat resistance can be further exhibited.

In the inorganic fiber of the invention, the content (mass %) of each component means a value obtained by the following method. Specifically, a method in which a part is taken out from an aqueous raw material spinning solution (mentioned later) which was used when preparing the fiber, and dried. Subsequently, the part was fired at 1000° C. for 2 hours to obtain powder. This powder was used as a measurement sample, and a measurement is conducted by means of an X-ray fluorescence spectrometer (RIX2000, manufactured by Rigaku Corporation). The resulting inorganic fibers may contain balancing components. In such a case, a compensation calculation is conducted such that the total amount of metal oxides excluding the balancing components becomes 100 mass %.

It is preferred that the inorganic fibers of the invention have the above-mentioned composition and be obtained by dissolving water-soluble basic acid aluminum, a water-soluble calcium compound and a water-soluble or water-dispersible silicon compound in an aqueous medium to prepare an aqueous raw material solution for spinning, and spinning the thus obtained aqueous raw material solution for spinning to obtain crude inorganic fibers, and firing of the crude inorganic fibers.

In the inorganic fibers of the invention, it is preferred that the above-mentioned basic acid aluminum be one or more selected from compounds represented by the following formula (I):

$$Al(OH)xYz \quad (I)$$

wherein X is a positive integer of more than 0 and less than 3,

Y is one selected from a Cl atom, an $NO_3$ group, an $SO_4$ group or an RCOO group;

Z is 3-X when Y is a Cl atom, an $NO_3$ group and an RCOO group, (3-X)/2 when Y is an $SO_4$ group; and R is a hydrogen atom or a hydrocarbon group or hydroxyl group-containing hydrocarbon group having 1 to 10 carbon atoms; and if a plurality of RCOO groups are present, the Rs may be the same or different.

The details of each raw material constituting the aqueous raw material solution, the spinning method and the firing conditions or the like will be mentioned later.

It is preferred that the inorganic fibers of the invention be obtained by the electrospinning method mentioned later.

The inorganic fibers of the invention can exhibit biosolubility if the average fiber diameter is less than 4 μm. The average fiber diameter of the inorganic fibers is preferably 3 μm or less, more preferably 1 μm or less, and further preferably 0.5 μm or less. If the average fiber diameter of the inorganic fibers is 1 μm or less, the fibers can be used as the constituting material for a filter material and a sealing material. The inorganic fibers having an average fiber diameter of 1 μm or less can be produced by adjusting the atmosphere or the applied voltage at the time of electro-spinning by the electrospinning method mentioned later, by adjusting the concentration or the viscosity of the aqueous raw material solution for spinning, or by other methods.

As for the inorganic fibers of the invention, when evaluation is made by an evaluation method of biosolubility mentioned later, it is preferred that the inorganic fibers of the invention have a dissolution speed of 20 $ng/cm^2 \cdot h$ or more for 0 to 24 hours after the start of the test, with 40 $ng/cm^2 \cdot h$ or more being more preferable. Further, the inorganic fibers having a dissolution speed of 20 $ng/cm^2 \cdot h$ or more for 24 to 48 hours after the start of the test, with 40 $ng/cm^2 \cdot h$ or more being more preferable. If the dissolution speed of the fibers for 0 to 24 hours after the start of the test is 500 $ng/cm^2 \cdot h$ or more, solubility can be expected if the dissolution speed for 24 to 48 hours after the start of the test is 20 $ng/cm^2 \cdot h$ or less. Although no specific restrictions are imposed on the upper limit of the dissolution speed, the dissolution speed is normally about 5400 $ng/cm^2 \cdot h$.

Since the inorganic fibers of the invention have a high biosolubility speed and excellent biosolubility, they exert only small effects on living environments, and can be allowed to have a small fiber diameter easily by the production method mentioned later. Therefore, a thin fibrous product having an average diameter of 1 μm or less can be used in various industrial fields as constituting materials such as a filter material and a sealing material.

In the application document of the invention, the average fiber diameter of the inorganic fibers mean an average value obtained by a method in which the widths of fibers at 10 to 111 locations which are arbitrarily selected from a photograph (magnification: ×2000 to 5000) taken by means of a scanning electron microscope (JSM-5800LV manufactured by the JEOL Ltd.) are measured, and calculated from the measured widths.

The inorganic fibers of the invention preferably have a melting point of 1300° C. or more. The melting point is more preferably 1350° C. or more, with 1367° C. or more being further preferable. Since the inorganic fibers of the invention have high heat resistance, i.e. having a melting point of 1300° C. or more, they can be preferably used as a filter material, a sealing material or the like.

In the application document of the invention, the melting point of the inorganic fibers is a value obtained from a thermodynamic equilibrium calculation based on the above-mentioned inorganic fiber composition.

Various methods can be given as a method for producing the inorganic fiber of the invention. Specifically, a method in which a raw material solution for spinning having a desired composition is subjected to dry spinning; a melt continuation spinning method in which a molten product having a desired composition is drawn from a spinning nozzle, cooled, and spinning is conducted while winding; a spinner method (external centrifugation method) in which a molten product having a desired composition is allowed to collide with a high-speed rotating body, and the molten product is allowed to be fibrous by the centrifugal force; an internal centrifugation method in which a molten product having a desired composition is discharged from a rotating body, and the molten product is then allowed to be fibrous; and a melt blow method in which a molten product having a desired composition is allowed to be fibrous by compressed air. As the above-mentioned dry spinning method, a dry continuous spinning method in which a raw material solution for spinning having a desired composition is discharged from a nozzle, and the discharged product is dried while winding by a winder and is elongated; a method in which a raw material solution for spinning having a desired composition is centrifuged in the stream of air and dried to obtain un-continuous fibers; or the electrostatic spinning method mentioned later.

In the dry spinning method, it is preferable to adjust adequately the viscosity of the raw material solution for spinning. The viscosity of the raw material solution for spinning can be adjusted by changing the amount of a spinning auxiliary to be added or by concentration by heating or pressure reduction or by dilution by addition of water.

For example, if a raw material solution for spinning is spun by the continuous spinning method in order to obtain a fiber having an average fiber diameter of several μm to several tens μm, it is preferred that the viscosity thereof be about several tens Pa·s to several hundreds Pa·s, with 60 Pa·s to 200 Pa·s being more preferable. If the viscosity is less than several tens Pa·s, the spinning solution extruded from a nozzle is likely to suffer capillary breakage by the surface tension, and as a result, spinning becomes difficult. Further, if the above-mentioned viscosity exceeds several hundreds Pa·s, aggregation-breakage occurs when elongating the fiber, whereby the fiber diameter is difficult to be reduced. At the same time, when a spinning solution is extruded from a nozzle, a high pressure is required to make a fiber production apparatus to be large.

For example, if spinning is conducted in order to obtain a fiber having an average fiber diameter of several μm by the rotating centrifugal circular disc method in which a raw material solution for spinning is ejected by centrifugation from a large number of holes and elongated, followed by spinning or by the blowing method in which a spinning solution is elongated by blowing air, the viscosity of the raw material solution for spinning is preferably several Pa·s to several tens Pa·s. If the above-mentioned viscosity is less than several Pa·s, problems that the raw material solution for spinning is scattered in the form of liquid droplets without becoming fibrous or even if the solution becomes fibrous, if the fiber is broken when the spinning solution is elongated, a large amount of circular particles called a shot is generated. If the viscosity is too large, elongation by centrifugal force or blowing becomes impossible, thereby making production of fibers impossible.

By subjecting the crude inorganic fiber obtained by the above-mentioned dry spinning method to a firing treatment appropriately, it is possible to obtain desired inorganic fiber by causing the organic matters in the crude inorganic fiber to disappear.

Of the above-mentioned methods for producing an inorganic fiber, the method for producing by the dry spinning method, in particular, the method for producing by using the electrospinning method is preferable since it can produce an intended inorganic fiber easily at a low cost.

As for the inorganic fibers of the invention, it is preferred that they be produced by a method in which water-soluble basic acid aluminum, a water-soluble calcium compound and a water-soluble or water-dispersible silicon compound are dispersed in an aqueous medium to prepare an aqueous raw material solution for spinning, the aqueous raw material solution for spinning is then subjected to spinning to obtain crude inorganic fibers, followed by firing of the crude inorganic fibers.

According to each of the above-mentioned methods, it is possible to produce the inorganic fibers of the invention, i.e. the inorganic fibers comprising 35 mass % to 88 mass % of $Al_2O_3$, 3 mass % to 45 mass % of CaO and 5 mass % to 40 mass % of $SiO_2$, wherein the total content of $Al_2O_3$, CaO and $SiO_2$ is 98 mass % or more of the entire fibers or the inorganic fibers comprising 39 mass % to 66 mass % of $Al_2O_3$, 26 mass % to 42 mass % of CaO and 8 mass % to 28 mass % of $SiO_2$, wherein the total content of $Al_2O_3$, CaO and $SiO_2$ is 98 mass % or more of the entire fibers can be prepared.

Then, an explanation will be made on the method for producing an inorganic fiber of the invention by the dry spinning method.

When the inorganic fibers of the invention are produced by the dry spinning method, as the raw material, aluminum or the like can be given. As the aluminum raw material, water-soluble basic acid aluminum can be given.

If the inorganic fibers of the invention are produced by the dry spinning method, as the water-soluble basic acid aluminum to be used as the raw material, one or more compounds selected from compounds represented by the following formula (I):

$$Al(OH)_xY_z \quad (I)$$

wherein X is a positive integer of more than 0 and less than 3, Y is one selected from a Cl atom, an $NO_3$ group, an $SO_4$ group and an RCOO group; Z is 3-X when Y is a Cl atom, an $NO_3$ group and an RCOO group, (3-X)/2 when Y is an $SO_4$ group and R is a hydrogen atom or a hydrocarbon group or hydroxyl group-containing hydrocarbon group having 1 to 10 carbon atoms. If a plurality of RCOO groups are present, the Rs may be the same or different. The basic acid aluminum as given above is an octahedral coordinated aluminum polynuclear complex (non-ionic polymer) in which cross linking is conducted by a hydroxyl group, and can take the form of a dimer or an oligomer.

In the basic acid aluminum represented by the compositional formula (I), it is preferred that X be a positive integer of 1 or more and 3 or less, with a positive integer of 1 or more and 2.5 or less being more preferable.

In the basic acid aluminum represented by the compositional formula (I), X can be calculated from the compositional ratio of acids or the like added when the basic acid aluminum is synthesized.

As for the basic acid aluminum represented by the compositional formula (I), basic carboxylic acid aluminum ($Al(OH)_x(RCOO)_{3-x}$) can preferably be used. If the basic acid aluminum represented by the formula (I) is basic carboxylic acid aluminum, it can suppress generation of chloride or nitric acid, which exerts great environmental burden when firing.

If the basic acid aluminum shown by the compositional formula (I) is basic carboxylic acid aluminum, the R constituting the RCOO group is a hydrogen atom or a hydrocarbon group or hydroxyl group-containing hydrocarbon group having 1 to 10 carbon atoms.

If R is a hydrocarbon group or hydroxyl group-containing hydrocarbon group, the number of carbon atoms is 1 to 10, with 1 to 5 being preferable. If the number of carbon atoms exceeds 10, the basic acid aluminum represented by the formula (I) hardly exhibits water solubility. Further, if R is a hydrocarbon group or hydroxyl group-containing hydrocarbon group, the hydrocarbon group part may be linear or branched. The hydrocarbon group part may be a saturated hydrocarbon group or an unsaturated hydrocarbon group.

If R is a hydrocarbon group, as examples of the hydrocarbon group, an alkyl group, an alkenyl group, a cycloalkyl group, an alkylcycloalkyl group or the like can be given.

Specifically, an alkyl group such as a methyl group, an ethyl group, a propyl group, and a butyl group (if these alkyl groups can be branched, the alkyl group may be linear or branched); an alkenyl group such as a propenyl group and a butenyl group (if these alkenyl groups can be branched, the alkenyl group may be linear or branched, and the position of a double bond may be arbitral); a cycloalkyl group such as a cyclopropyl group and a cyclobutyl group; an alkylcycloalkyl group such as a methylcyclopropyl group and a methylcyclobutyl group (the substitution position of the alkyl group to the cycloalkyl group is also arbitral) or the like can be given.

If R is a hydroxyl group-containing hydrocarbon group, as the hydroxyl group-containing hydrocarbon group, a hydroxylalkyl group, a hydroxyalkenyl group, a hydroxycycloalkyl group or the like can be given.

Specifically, a hydroxyalkyl group such as a hydroxylmethyl group, a hydroxyethyl group, a hydroxypropyl group and a hydroxybutyl group (if these hydroxyalkyl groups can be branched, the alkyl groups constituting the hydroxyalkyl group may be linear or branched), a hydroxyalkenyl group such as a hydroxybutenyl group (the alkenyl group constituting the hydroxyalkenyl group may be linear or branched, and the position of a double bond may be arbitral); a hydroxycycloalkyl group such as a hydroxycyclopropyl group and a hydroxycyclobutyl group (the substitution position of the hydroxyl group or the alkyl group to a cycloalkyl group is arbitral) or the like can be given.

In respect of stability in water, as the RCOO group, a reaction residue of carboxylic acid selected from formic acid, acetic acid and lactic acid (a HCOO group, a $CH_3COO$ group, a $CH_3CH(OH)COO$ group) is preferable.

When the inorganic fibers of the invention are prepared by the dry spinning method, as the calcium raw material, a water-soluble calcium compound is used. As the calcium compound, no specific restrictions are imposed as long as it is water-soluble and can be dissolved in a desired amount in the aqueous raw material solution for spinning, which will be mentioned later. For example, carbonates, nitrates, sulfates, acetates, hydroxides, chlorides, fluorides, borates, phosphates or the like of calcium can be given.

Of these calcium compounds, in the production method of the invention, if basic carboxylic acid aluminum is used as the aluminum compound to be dissolved in the aqueous raw material solution for spinning, it is preferred that a calcium compound be also a carboxylate. In respect of easiness of solubility in an aqueous raw material solution for spinning or easiness in obtaining materials, calcium acetate hydrate is more preferable.

When the inorganic fibers of the invention are prepared by the dry spinning method, as the silicon raw material, a water-soluble or a water-dispersible silicon compound is used. As the silicon compound, no specific restrictions are imposed as long as it is dissolved or dispersed in an aqueous raw material solution for spinning. For example, as the water-soluble silicon compound, a water-soluble silicate, a water-soluble silicon alkoxide(tetramethoxysilane, tetraethoxysilane, tetrapropoxysilane or the like) can be given. As the water-dispersible silicon compound, silica sol (colloidal silica) or the like can be given. Of these silicon compounds, silica sol (colloidal silica) is preferable in respect of viscosity stability or the like of the aqueous raw material solution for spinning.

As the silica sol, one obtained by dispersing silica having a particle size of 4 to 100 nm in a medium having a solid content of 5 mass % to 30 mass % is preferable. Silica sol can be produced by the sol-gel method in which sol is produced from alkoxysilane or the sodium silicate method in which silica sol is produced from sodium silicate.

In the production method of the inorganic fiber of the invention, if need arises, a spinning auxiliary may further be used. As the spinning auxiliary, no specific restrictions are imposed on the spinning auxiliary as long as it can prepare a desired inorganic fiber. However, in respect of easiness in handling or solubility, it is preferred that the spinning auxiliary be a water-soluble organic polymer. For example, polyethylene oxide, polypropylene oxide, polyvinyl alcohol, polyvinyl ether, polyvinyl ester, polyacrylic acid ester and a copolymer thereof can be given. Of these, polyacrylic acid ester is preferable.

In the production method of the inorganic fiber of the invention, by adding a spinning auxiliary, variations in fiber diameter are suppressed, whereby stable spinning can be realized. Further, the strength of unfired fibers after the electrostatic spinning is improved, thereby leading to excellent handling properties.

In the production method of the invention, water-soluble basic acid aluminum, a water-soluble calcium compound, a water-soluble or water-dispersible silicon compound, and if necessary, a spinning auxiliary are dissolved in an aqueous medium, an aqueous raw material solution for spinning is prepared.

As the aqueous medium, water is preferable. In order to improve the stability of a solution or in order to conduct spinning stably, a medium which is composed mainly of water and containing other mediums which are soluble in water, for example, alcohols, ketones, amines, amides, carboxylic acids or the like may be used. Further, one obtained by adding an organic salt such as ammonium chloride to these mediums may be used.

The concentration of the water-soluble basic acid aluminum in the aqueous raw material solution for spinning is preferably 4 mass % to 83 mass %, with 4 mass % to 68 mass % being more preferable.

In the aqueous raw material solution for spinning, the amount of aluminum relative to the total amount of aluminum, calcium and silicon is preferably 35 mass % to 88 mass % in terms of $Al_2O_3$, more preferably 39 mass % to 87 mass %, further preferably 39 mass % to 83 mass %, still further preferably 39 mass % to 66 mass %, still further preferably 49 mass % to 66 mass %, when aluminum, calcium and silicon are expressed in terms of $Al_2O_3$, CaO and $SiO_2$.

If the amount of aluminum exceeds 88 mass % in terms of $Al_2O_3$ relative to the total amount of aluminum, calcium and silicon, the relative amount of calcium becomes small and as a result, desired biosolubility cannot be obtained easily. If the amount of aluminum is less than 35 mass % in terms of $Al_2O_3$ relative to the total amount of aluminum, calcium and silicon, desired heat resistance or biosolubility cannot be exhibited easily.

The concentration of the water-soluble calcium compound in the aqueous raw material solution for spinning is preferably 0.4 mass % to 46 mass %, more preferably 2 mass % to 46 mass %.

In the aqueous raw material solution for spinning, the amount of calcium relative to the total amount of aluminum, calcium and silicon is preferably 3 mass % to 45 mass % when aluminum, calcium and silicon are expressed in terms of $Al_2O_3$, CaO and $SiO_2$, more preferably 3 mass % to 42 mass %, and further preferably 26 mass % to 42 mass %.

If the amount of calcium exceeds 45 mass % in terms of CaO relative to the total amount of aluminum, calcium and silicon, the relative amount of other metal elements becomes small and as a result, desired biosolubility cannot be obtained easily. If the amount of calcium is less than 3 mass %, desired heat resistance or biosolubility cannot be exhibited easily.

It is preferred that the aqueous raw material solution for spinning comprise 0.4 mass % to 24 mass %, more preferably 0.4 mass % to 16 mass %, and further preferably 0.4 mass % to 8 mass %, of a water-soluble or water-dispersible silicon compound.

In the aqueous raw material solution for spinning, the amount of silicon relative to the total amount of aluminum, calcium and silicon is preferably 5 mass % to 40 mass %, more preferably 8 mass % to 39 mass %, further preferably 8 mass % to 39 mass %, and further preferably 8 mass % to 28 mass %, when aluminum, calcium and silicon are expressed in terms of $Al_2O_3$, CaO and $SiO_2$.

If the amount of silicon exceeds 40 mass % in terms of $SiO_2$ relative to the total amount of aluminum, calcium and silicon, the relative amount of silicon becomes small and as a result, desired biosolubility cannot be obtained easily. If the amount of silicon is less than 5 mass % relative to the total amount of aluminum, calcium and silicon, desired heat resistance cannot be exhibited easily.

When the aqueous raw material solution for spinning contains a spinning auxiliary, the concentration of the spinning auxiliary in the aqueous raw material solution for spinning is preferably 0.1 mass % to 10 mass %, more preferably 0.1 mass % to 5 mass %. It is preferred that the amount of the spinning auxiliary be as small as possible in order to allow the fiber to be dense after firing and to retain the strength. However, if the amount of the spinning auxiliary is small, the fiber morphology may not be stable at the time of production. Therefore, it is preferable to adjust the amount to be added, if necessary.

No particular restrictions are imposed on the method for producing the aqueous raw material solution for spinning. For example, it may be produced by mixing an aqueous medium, water-soluble basic acid aluminum, a water-soluble carcium compound, a water-soluble or water-dispersible silicon compound, and if necessary, a spinning auxiliary or other arbitral components such that each component is dissolved at a desired concentration. Alternatively, it may be produced by mixing an aqueous solution of water-soluble basic acid aluminum, an aqueous solution of a water-soluble carcium compound, an aqueous solution of a water-soluble or water-dispersible silicon compound and, if necessary, an aqueous solution of a spinning auxiliary or other arbitral components such that each component is dissolved at a desired concentration.

When the inorganic fibers of the invention are prepared, it is preferred that the above-mentioned aqueous raw material solution for spinning be subjected to spinning by the electrostatic spinning method to obtain crude inorganic fibers.

The electrostatic spinning method is a method in which a voltage is applied to the aqueous raw material solution for spinning containing a fiber-forming compound, and the aqueous raw material solution for spinning is discharged utilizing electrostatic repulsion and is allowed to be fibrous.

As the method for discharging the aqueous raw material solution for spinning to the electrostatic field to which a voltage has been applied, an arbitral method can be used. For example, a method in which the aqueous raw material solution for spinning is placed at an appropriate position in the electrostatic field, and a voltage is applied to the aqueous raw material solution for spinning and the aqueous raw material solution for spinning is then spun by utilizing the electric field and is allowed to be fibrous can be given. Specifically, for example, a method in which, in the state where the aqueous raw material solution for spinning is supplied to a nozzle, the nozzle is placed at an appropriate position in the electrostatic field, and the aqueous raw material solution for spinning is then pulled out from the nozzle by the electric field and is allowed to be fibrous can be given.

The specific embodiment of the spinning by the electrospinning method according to the invention will be explained with reference to FIG. 1.

FIG. 1 is a view showing one example of a spinning apparatus to be used for electrospinning. In FIG. 1, a spinning apparatus 1 is formed of a syringe 2, a nozzle 3, a high-voltage generating apparatus 4 and a sample collection table 5.

In the spinning apparatus 1 shown in FIG. 1, the aqueous raw material solution for spinning is supplied to the front end part of the nozzle 3 after being filled in the syringe 2. The high-voltage generating apparatus 4 is electrically connected to a conductive fixing part and the conductive sample collection table 5 which are respectively provided around the nozzle 3. By applying a voltage to the nozzle 3 through the fixing part provided around the nozzle 3, the aqueous raw material solution for spinning is ejected from the front end of the nozzle 3, and the solution is allowed to be fibrous to obtain crude inorganic fibers. The resulting crude inorganic fibers are collected on the sample collection table 5 as a counter electrode.

When the aqueous raw material solution for spinning is supplied to the electrostatic field from the nozzle 3, it is possible to provide a plurality of nozzles 3 and to arrange the nozzles 3 in parallel to increase the production speed of a fibrous material.

As for the voltage to be applied at the time of electrospinning, taking into consideration conditions such as the distance between the front end of the nozzle and the counter electrode (distance between the electrodes), the viscosity of the aqueous raw material solution for spinning, the concentration of the aqueous raw material solution for spinning or the like, the voltage is preferably 1 to 100 kV, with 3 to 30 kV being more preferable.

The distance between electrodes depends on the electric charge amount, the nozzle dimension, the ejected amount of an aqueous raw material solution for spinning from the nozzle, the concentration of the aqueous raw material solution for spinning or the like. However, the distance is preferably 20 to 500 mm, more preferably 50 to 300 mm, with 100 to 200 mm being further preferable.

The viscosity of the aqueous raw material solution for spinning is preferably about 0.01 to 5.0 Pa·s, more preferably about 0.05 to 3.0 Pa·s. If the viscosity of the aqueous raw material solution for spinning is less than 0.01 Pa·s, the aqueous raw material solution for spinning is not fibrous when spinning, thereby generating spherical particles. If the viscosity of the aqueous raw material solution for spinning exceeds 5.0 Pa·s, a treatment for allowing it to be fibrous becomes difficult. The viscosity of the aqueous raw material solution for spinning can be adjusted by adjusting the amount of a spinning auxiliary or by conducting a concentration operation by a heat treatment or a pressure-reduction treatment appropriately.

In this application document, the viscosity of the aqueous raw material solution for spinning means a value measured by the method explained below. The viscosity is measured by means of a rheometer (Physica MCR301, manufactured by Anton Paar, Ltd.). The viscosity of the spinning solution in this application is a shearing viscosity when the shearing speed was $10s^{-1}$. The viscosity was measured while keeping the liquid temperature of the spinning solution at 25° C.

It is preferred that the crude inorganic fibers obtained by electrostatic spinning have an average fiber diameter of 10 nm to 2000 nm, more preferably 50 nm to 1000 nm.

In this application document, the average fiber diameter of the crude inorganic fibers means an average value by a method in which, from a photograph (magnification ×2000 to 5000), taken by a scanning electron microscope (JSM-5800LV, manufactured by JEOL, Ltd.), 10 to 111 locations are arbitrarily selected, the widths of the fibers are measured, and calculation is conducted from the widths thus measured.

In the production method of the invention, subsequently, the crude inorganic fibers obtained by the electrospinning method are fired.

The firing temperature is preferably 500° C. or more and less than the liquid phase generation temperature. Specifically, the firing temperature is preferably 500° C. or more and 1350° C. or less, at which no liquid phase is generated.

If the firing temperature is less than 500° C., organic components such as organic polymers used as the spinning auxiliary may remain in the inorganic fibers. If the firing temperature exceeds 1350° C., the inorganic fibers obtained as a result of the growth of crystal particles may be significantly brittle or the inorganic fibers may react with the hearth as a result of the generation of a liquid phase.

By controlling the firing temperature to a desired range, it is possible to impart the resulting inorganic fibers with further excellent biosolubility.

Firing can be conducted by means of a known electrical furnace or the like. In order to decompose the organic compounds used as the spinning auxiliary, it is preferred that the atmosphere at the time of firing be an atmospheric air or an oxidizing atmosphere. If the decomposition performance of the remaining organic product is not required to be taken into consideration, the firing may be conducted in the nitrogen atmosphere.

As mentioned above, according to the invention, even if the average fiber diameter is 1 μm or less, the inorganic fibers can exhibit high biosolubility with minimized adverse effects being exerted on the human body or the living environment. At the same time, it is possible to provide inorganic fibers having excellent heat resistance which is preferable as the constituting material such as a filter material and a sealing material.

EXAMPLES

The invention will be explained in more detail according to the Examples and the Comparative Examples given below, which should not be construed as limiting the scope of the invention.

In the following Examples and Comparative Examples, biosolubility was evaluated by the method shown below.

(Method for Evaluating Biosolubility)

Of the inorganic fibers obtained, fibers of which the amount is within the range of 25 mg were preciously weighed and used as the sample for evaluation.

Subsequently, this evaluation sample was placed on a membrane filter made of PTFE (polytetrafluoroethylene) having a pore diameter of 0.1 μm. Further, on the top of the evaluation sample, a PTFE-made membrane filter having a pore diameter of 1 μm was further placed and fixed as a filter unit. To the filter unit, a physiological saline having a pH of 5.0 shown in Table 1 was circulated at a flow rate of 0.15 ml/min.

The physiological saline which was circulated the evaluation sample was collected in a tank provided in the lower part of the filter unit. Due to the passage of the physiological saline of the evaluation sample, inorganic fiber components are eluted. While keeping the temperature of physiological saline during the evaluation test at 37° C., which is the temperature of a body fluid, the inorganic fiber component eluate collected in the tank was taken out 24 hours and 48 hours after the start of the test. The amount of the eluted fiber components was quantified by means of ICP emission spectrometry, and the solubility was calculated based on this value.

In the case of the simple solubility, the fiber surface area may vary due to difference in fiber diameter. Therefore, the fiber diameter was separately calculated to obtain a fiber surface area. From this fiber surface area, the measured value of solubility, the real density of the fiber and the amount used of the sample, the solubility per unit time and unit fiber surface area ($ng/cm^2 \cdot h$) was calculated to obtain a dissolution speed. As for the dissolution speed, the speed 0 to 24 hours after the start of the test was obtained. In Examples 1, 10 to 13, 16 to 20, 22 to 23, and 25, the speed 24 to 48 hours after the start of the test was obtained.

Since the outer shape of the resulting inorganic fibers was nearly cylindrical, the surface area of the inorganic fibers was calculated by determining the total side surface area on the assumption that the inorganic fibers had a columnar shape.

That is, if an assumption is made that the mass of the inorganic fibers is taken as M(g), the total length of the inorganic fiber is L(m), the average fiber diameter of the inorganic fiber is d(m) and the real density of the inorganic fibers is $\rho(kg/m^3)$, the following formula (1) is established.

$$M=\pi\times d^2\times L\times\rho/4 \quad (1)$$

Further, the surface area S ($m^2$) of the inorganic fiber is represented by the following formula (2).

$$S=\pi\times d\times L \quad (2)$$

From the formula (2), $L=S/(\pi\times d)$ is derived. This relationship is substituted into the formula (I) to obtain S as the following formula (3);

$$S=4M/d\rho \quad (3)$$

Specifically, the mass M(g) of the inorganic fibers was actually measured. The average fiber diameter d(m) of the inorganic fibers was determined by means of a scanning electron microscope (JSM-5800LV, manufactured by JEOL, Ltd.) and the real density $\rho(kg/m^3)$ of the inorganic fibers was determined from a ground product of the inorganic fibers by the pycnometer method. These values obtained each are substituted into the above formula (3) to obtain the surface area $S(m^2)$ of the inorganic fibers.

The speed of dissolution in physiological saline obtained by the above-mentioned evaluation serves as an index of chemical resistivity against the body fluid. As for this value, a higher value indicates that chemical resistance to the body fluid is low, and as a result, adverse effects exerted by the fibers to the living body are small.

TABLE 1

| Composition of physiological saline | |
|---|---|
| | g/L |
| Sodium chloride | 6.778 |
| Calcium chloride | 0.022 |
| Sodium dihydrogen phosphate, di-hydrate | 0.180 |
| Sodium hydrogen carbonate | 2.270 |

TABLE 1-continued

| Composition of physiological saline | |
|---|---|
| | g/L |
| Trisodium citrate, di-hydrate | 0.060 |
| Glycine | 0.454 |
| Ammonium chloride | 0.540 |
| 96% Sulfuric acid | 0.144 |
| Potassium dihydrogen citrate | 11.510 |
| Sodium hydroxide | 1.128 |

Example 1

By using $Al(OH)_x(RCOO)_{3-X}$ (X is 1.7 and R has 0 to 2 carbon atoms) as a basic aluminum carboxylate, an aqueous raw material solution for spinning was prepared as follows.

Specifically, to 100 parts by mass of an aqueous basic aluminum carboxylate solution of which the aluminum concentration in terms of $Al_2O_3$ was 10.5 mass %, 47.2 parts by mass of an aqueous calcium acetate solution of which the calcium concentration in terms of CaO was 7.3 mass %, 29.2 parts by mass of colloidal silica of which the silicon concentration in terms of $SiO_2$ was 20.5 mass % and 28.6 parts by mass of an aqueous polyacrylic ester solution of which the concentration was 6.0 mass % were added and mixed, followed by concentration, according to need. As a result, an aqueous raw material solution for spinning having a viscosity of 1.0 Pa·s was prepared.

This aqueous raw material solution for spinning comprised 52.6 mass % of aluminum, 17.4 mass % of calcium and 30.0 mass % of silicon relative to the total amount of aluminum, calcium and silicon, when aluminum, calcium and silicon are respectively expressed in terms of $Al_2O_3$, CaO and $SiO_2$.

Subsequently, by using a spinning apparatus 1 shown in FIG. 1, the aqueous raw material solution for spinning was subjected to spinning. The spinning was conducted by the following procedures. Specifically, the aqueous raw material solution for spinning was charged in a syringe 2, and then delivered to the front end part of a nozzle 3. The aqueous raw material solution for spinning was ejected from the front end of the nozzle 3 and was allowed to be fibrous by applying a voltage of 10.0 kV from a high-voltage generator 4 which was electrically-connected to a fixing part and a sample collection table 5 provided around the nozzle 3. The fibrous products were collected on the sample collection table 5 of which the distance from the front end of the nozzle 3 had been adjusted to 150 mm, whereby crude inorganic fibers were obtained.

The crude inorganic fibers obtained were fired by heating up to 1000° C. at a heating rate of 500° C./hour in an electrical furnace in an air atmosphere and retained for 2 hours, whereby inorganic fibers were obtained.

The resulting inorganic fibers had an average fiber diameter of 1.53 μm and comprised 53.4 mass % (39.6 mol %) of $Al_2O_3$, 18.7 mass % (25.2 mol %) of CaO and 27.9 mass % (35.2 mol %) of $SiO_2$.

In order to evaluate biosolubility of the inorganic fiber, the dissolution speed thereof was measured by using the above-mentioned method. The dissolution speed 0 to 48 hours and the dissolution speed 24 to 48 hours after the start of the test were 458 ng/cm$^2$·h and 560 ng/cm$^2$·h, respectively. The melting point was 1392° C.

The temperature during firing and the composition (indicated by mass % and mol %) of the inorganic fibers obtained are shown in Table 2. The firing temperature and the average fiber diameter, the dissolution speed and the melting point thereof are shown in Table 3.

Examples 2 to 27 and Comparative Example 1

Inorganic fibers were prepared in the same manner as in Example 1, except that the amount of the aqueous solution of the basic aluminum carboxylate, the amount of the aqueous solution of calcium acetate and the amount of colloidal silica in the aqueous raw material solution for spinning were adjusted such that the amounts of $Al_2O_3$, CaO and $SiO_2$ in the resulting inorganic fibers became the values shown in Table 2, and the firing temperature (retained at this temperature for 2 hours in the electrical furnace) was changed to the temperature in Table 3.

For the resulting inorganic fibers, the average fiber diameter was obtained in the same manner as in Example 1, and the biosolubility was evaluated and the melting point was measured. The results are shown in Table 3. In Example 13 or the like, it was found that the dissolution speed 0 to 24 hours after the start of the test was lower than the speed 24 to 48 hours after the start of the test. The reason for this is that a large part of the sample was dissolved or disappeared.

The temperature during the firing and the composition (indicated by mass % and mol %) of the resulting inorganic fibers were shown in Table 2. The average fiber diameter, dissolution speed and melting point thereof are shown in Table 3.

In Comparative Example 1, spinning could not be conducted since a precipitate was generated during the step of viscosity control of the aqueous raw material solution for spinning.

TABLE 2

| | | Composition (mass %) | | | Composition (mol %) | | |
|---|---|---|---|---|---|---|---|
| | | $Al_2O_3$ | CaO | $SiO_2$ | $Al_2O_3$ | CaO | $SiO_2$ |
| Example | 1 | 53.4 | 18.7 | 27.9 | 39.6 | 25.2 | 35.2 |
| | 2 | 56.6 | 34.5 | 8.9 | 42.1 | 46.7 | 11.3 |
| | 3 | 65.9 | 25.0 | 9.1 | 52.0 | 35.8 | 12.2 |
| | 4 | 75.5 | 15.1 | 9.5 | 63.5 | 23.0 | 13.5 |
| | 5 | 82.4 | 8.6 | 9.0 | 72.8 | 13.7 | 13.5 |
| | 6 | 49.7 | 42.0 | 8.3 | 35.5 | 54.5 | 10.0 |
| | 7 | 70.4 | 12.8 | 16.9 | 57.6 | 19.0 | 23.4 |
| | 8 | 44.7 | 27.7 | 27.5 | 31.5 | 35.6 | 32.9 |
| | 9 | 56.6 | 34.5 | 8.9 | 42.1 | 46.7 | 11.3 |
| | 10 | 60.7 | 11.9 | 27.4 | 47.1 | 16.8 | 36.1 |
| | 11 | 75.5 | 15.1 | 9.5 | 63.5 | 23.0 | 13.5 |
| | 12 | 51.4 | 10.1 | 38.6 | 38.0 | 13.6 | 48.4 |
| | 13 | 46.5 | 16.3 | 37.2 | 33.4 | 21.2 | 45.4 |
| | 14 | 49.7 | 42.0 | 8.3 | 35.5 | 54.5 | 10.0 |
| | 15 | 39.1 | 33.8 | 27.1 | 26.7 | 42.0 | 31.3 |
| | 16 | 64.3 | 6.8 | 28.9 | 51.2 | 9.8 | 39.1 |
| | 17 | 82.4 | 8.6 | 9.0 | 72.8 | 13.7 | 13.5 |
| | 18 | 86.7 | 4.5 | 8.8 | 78.9 | 7.5 | 13.6 |
| | 19 | 78.0 | 3.9 | 18.1 | 67.4 | 6.1 | 26.5 |
| | 20 | 74.4 | 7.8 | 17.8 | 62.6 | 12.0 | 25.4 |
| | 21 | 51.3 | 31.5 | 17.3 | 37.2 | 41.5 | 21.3 |
| | 22 | 70.4 | 12.8 | 16.9 | 57.6 | 19.0 | 23.4 |
| | 23 | 69.9 | 22.1 | 8.0 | 56.6 | 32.5 | 10.9 |
| | 24 | 54.7 | 29.9 | 15.4 | 40.4 | 40.2 | 19.4 |
| | 25 | 69.9 | 22.1 | 8.0 | 56.6 | 32.5 | 10.9 |
| | 26 | 54.7 | 29.9 | 15.4 | 40.4 | 40.2 | 19.4 |
| | 27 | 39.4 | 24.5 | 36.0 | 27.2 | 30.7 | 42.1 |
| Com. Ex. | 1 | 42.5 | 7.5 | 50.0 | 30.1 | 9.7 | 60.2 |

TABLE 3

| | Composition (mass %) | | | Firing temperature | Average fiber diameter | Dissolution speed (0-24 hours after the start of measurement) | Dissolution speed (24-48 hours after the start of measurement) | Melting point |
|---|---|---|---|---|---|---|---|---|
| | $Al_2O_3$ | CaO | $SiO_2$ | (° C.) | (μm) | ($ng/cm^2 \cdot h$) | ($ng/cm^2 \cdot h$) | (° C.) |
| Ex. 1 | 53.4 | 18.7 | 27.9 | 1000 | 1.53 | 458 | 560 | 1392 |
| Ex. 2 | 56.6 | 34.5 | 8.9 | 1000 | 0.85 | 2840 | — | 1529 |
| Ex. 3 | 65.9 | 25.0 | 9.1 | 1000 | 0.87 | 1446 | — | 1443 |
| Ex. 4 | 75.5 | 15.1 | 9.5 | 1000 | 0.91 | 1023 | — | 1392 |
| Ex. 5 | 82.4 | 8.6 | 9.0 | 1000 | 0.97 | 621 | — | 1446 |
| Ex. 6 | 49.7 | 42.0 | 8.3 | 1000 | 0.93 | 3053 | — | 1474 |
| Ex. 7 | 70.4 | 12.8 | 16.9 | 1000 | 0.72 | 632 | — | 1447 |
| Ex. 8 | 44.7 | 27.7 | 27.5 | 800 | 1.00 | 5373 | — | 1392 |
| Ex. 9 | 56.6 | 34.5 | 8.9 | 800 | 0.89 | 2758 | — | 1529 |
| Ex. 10 | 60.7 | 11.9 | 27.4 | 800 | 1.06 | 484 | 765 | 1546 |
| Ex. 11 | 75.5 | 15.1 | 9.5 | 800 | 0.94 | 1647 | 639 | 1392 |
| Ex. 12 | 51.4 | 10.1 | 38.6 | 800 | 0.88 | 319 | 364 | 1367 |
| Ex. 13 | 46.5 | 16.3 | 37.2 | 800 | 1.03 | 1974 | 566 | 1546 |
| Ex. 14 | 49.7 | 42.0 | 8.3 | 800 | 1.00 | 3005 | — | 1474 |
| Ex. 15 | 39.1 | 33.8 | 27.1 | 800 | 0.85 | 3903 | — | 1392 |
| Ex. 16 | 64.3 | 6.8 | 28.9 | 800 | 1.37 | 120 | 147 | 1546 |
| Ex. 17 | 82.4 | 8.6 | 9.0 | 800 | 1.01 | 201 | 169 | 1446 |
| Ex. 18 | 86.7 | 4.5 | 8.8 | 800 | 1.10 | 67 | 76 | 1447 |
| Ex. 19 | 78.0 | 3.9 | 18.1 | 800 | 1.26 | 79 | 47 | 1546 |
| Ex. 20 | 74.4 | 7.8 | 17.8 | 800 | 1.21 | 65 | 97 | 1546 |
| Ex. 21 | 51.3 | 31.5 | 17.3 | 800 | 0.97 | 3742 | — | 1392 |
| Ex. 22 | 70.4 | 12.8 | 16.9 | 800 | 0.96 | 523 | 761 | 1447 |
| Ex. 23 | 69.9 | 22.1 | 8.0 | 1000 | 0.85 | 288 | 223 | 1442 |
| Ex. 24 | 54.7 | 29.9 | 15.4 | 1000 | 1.01 | 4944 | — | 1392 |
| Ex. 25 | 69.9 | 22.1 | 8.0 | 800 | 0.85 | 1835 | 744 | 1442 |
| Ex. 26 | 54.7 | 29.9 | 15.4 | 800 | 1.30 | 5294 | — | 1392 |
| Ex. 27 | 39.4 | 24.5 | 36.0 | 800 | 0.73 | 1664 | — | 1392 |
| Com. Ex. 1 | 42.5 | 7.5 | 50.0 | Could not be fibrous due to precipitation | | | | |

From the results shown in Table 3, the inorganic fibers obtained in Examples 1 to 27 each had a dissolution speed of 65 $ng/cm^2 \cdot h$ or more 0 to 24 hours after the start of the test and a dissolution speed of 47 $ng/cm^2 \cdot h$ or more 24 to 48 hours after the start of the test. The results show that the inorganic fibers exhibit excellent biosolubility. The melting point of 1367° C. or higher indicates high heat resistance.

On the other hand, it can be understood that the aqueous raw material solution for spinning in Comparative Example 1 could not become fibrous.

INDUSTRIAL APPLICABILITY

According to the invention, it is possible to provide inorganic fibers having a high dissolution speed in a living body and having excellent biosolubility, and high heat resistance.

EXPLANATION OF THE SYMBOLS

1 Spinning apparatus

2 Syringe

3 Nozzle

4 High-voltage generator

5 Sample collection table

The invention claimed is:

1. Inorganic fibers comprising:

(a) 39 mass% to 66 mass% of $Al_2O_3$;

(b) 26 mass% to 42 mass% of CaO; and (c) 8 mass% to 28 mass% of $SiO_2$, wherein the total content of $Al_2O_3$, CaO and $SiO_2$ is 98 mass% or more of the entire fibers.

2. The inorganic fibers according to claim 1, wherein the inorganic fibers have a dissolution speed of more than 1974 $ng/cm^2 \cdot h$ in a physical saline, within 24 hours of a start of a test to measure a dissolution speed.

3. The inorganic fibers according to claim 2, wherein the inorganic fibers have a melting point of 1300° C. or greater.

4. The inorganic fibers according to claim 2, wherein the inorganic fibers have an average fiber diameter of 3 μm or less.

5. The inorganic fibers according to claim 2, wherein the inorganic fibers have an average fiber diameter of 1 μm or less.

6. A filter material or a sealing material comprising the inorganic fibers according to claim 1.

7. The inorganic fibers according to claim 1, wherein the inorganic fibers have a dissolution speed of more than 2758 $ng/cm^2 \cdot h$ in a physical saline, within 24 hours of a start of a test to measure a dissolution speed.

8. The inorganic fibers according to claim 7, wherein the inorganic fibers have a melting point of 1300° C. or greater.

* * * * *